United States Patent Office 3,353,706
Patented Nov. 21, 1967

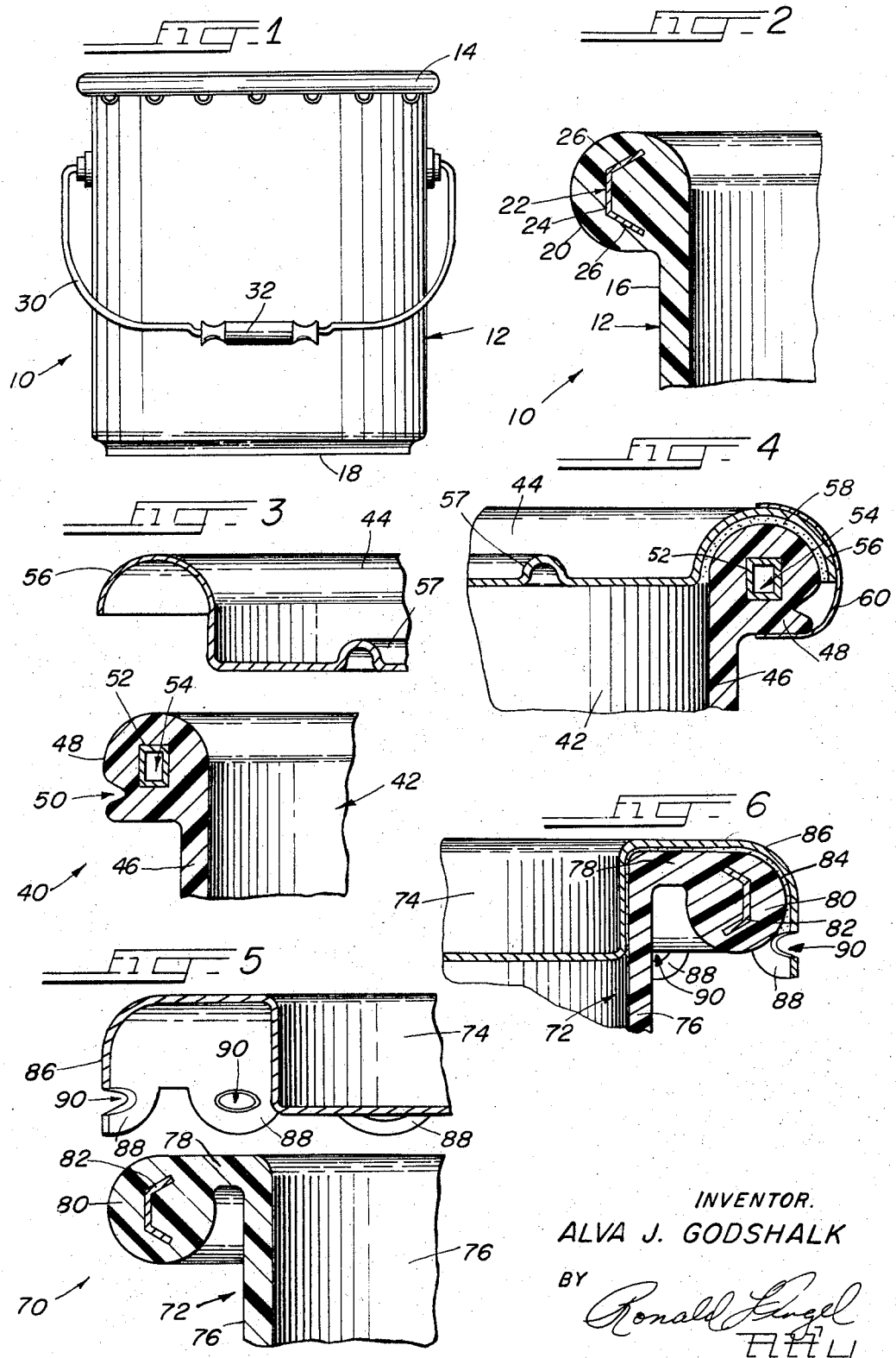

3,353,706
PLASTIC CONTAINER
Alva J. Godshalk, Homewood, Ill., assignor to Bennett
Industries, Inc., Peotone, Ill., a corporation of Illinois
Filed Aug. 4, 1965, Ser. No. 477,117
3 Claims. (Cl. 220—73)

ABSTRACT OF THE DISCLOSURE

It has been found that a plastic pail provided with a closed loop, generally cylindrical reinforcing supporting channel embedded in and completely surrounded by the plastic material of the pail adjacent its open end can be made sufficiently strong and distortion-free to withstand the abuses of freight handling and shipping. Specifically, the pail is provided with a downwardly extending bead offset outwardly from the open end thereof by a relatively narrow out turned flange. The bead, flange, and the upper portion of the pail serve to provide a strength-imparting configuration to the open end of the pail. This reinforced configuration, comprising a pair of circumferential members (i.e., the bead and the top portion of the pail side wall) and the flange that is perpendicularly disposed therebetween, cooperates to support and reinforce the open end of the pail and to make it substantially rigid. Furthermore, a reinforcing channel is embedded in the bead and extends below the open end of the pail so as to reinforce the outer portion of the strength-imparting configuration.

---

This invention relates generally to plastic containers and more specifically to a reinforced open end plastic container having a reinforcing channel embedded in the plastic material of the pail adjacent the open end thereof.

Shippers and storers have long sought a container that would be suitable for use in packing, storing, and shipping liquids, semiliquids, and dry materials, and that could be fabricated from plastic rather than conventional metal such as steel. A plastic container suitable for shipping and storage would be more economical than a similarly sized metal container by reason of the comparatively higher cost of conventionally utilized metals (such as steel) in relation to plastics (such as polyethylene). Moreover, the problems of corrosion, which often arise with metal containers, could be avoided since plastics are generally more more resistant than metals to corrosion and other similar forms of attack. Additionally, the effective substitution of plastic for metal in a commercial container could yield significant economies with respect to the weight of the resultant container.

However, a difficulty which has heretofore precluded the use of plastic containers for such purposes, is that plastics are generally susceptible to distortion (e.g., due to impact) and are not sufficiently strong to insure safe, leakproof packaging, storing, and shipping under the conditions to which such containers are subjected in transit and storage.

One approach to the problem of developing a suitable plastic shipping container is described in a co-pending United States patent application entitled Plastic Containers, Ser. No. 460,443, filed June 1, 1965, in the name of applicant. The said co-pending application discloses a plastic pail provided with a reinforcing supporting collar adjacent its open end.

The present invention provides another form of plastic container suitable for packaging, storing, and shipping liquids, semiliquids, and dry materials. It has now been found that a plastic pail provided with a closed loop, generally cylindrical reinforcing supporting channel embedded in and completely surrounded by the plastic material of the pail adjacent its open end can be made sufficiently strong and distortion-free to withstand the abuses of freight handling and shipping. Preferably, the supporting channel is formed of a material (such as steel) that is substantially more rigid than the plastic material of the pail. In addition, such a pail is capable of accepting conventional closure members, such as lug, band, or lever interconnecting type closures. In a preferred practice of the subject invention, the supporting channel is molded as a part of a bead or curl formed along the rim of the plastic pail, which thus serves as a reinforced, thickened edge for the open end of the plastic container. The plastic container is preferably fabricated by means of conventional molding techniques (e.g., injection molding), and the supporting channel may conveniently be embedded in the plastic during fabrication of the plastic pail.

A primary object of the present invention is to provide a container comprising an open end plastic pail which has a metal supporting channel embedded therein adjacent the open end thereof and which is capable of withstanding shipping abuses.

Another object of the present invention is to provide a container of the character described which is capable of receiving conventional pail closures.

A further object of the present invention is to provide a container of the character described which can economically be formed of a plastic pail having relatively thin walls, yet which is capable of withstanding freezing temperatures, of withstanding crushing when subjected to static loads, and of resisting cracking when vibrated, in conformity with the requirements for containers suitable for use in freight handling and shipping.

Yet another object is to provide a container, the parts of which may be easily fabricated in accordance with conventional techniques, and which can be assembled quickly and economically with a minimum amount of effort.

These and other objects, advantages, and features of the present invention will hereinafter appear, and, for purposes of illustration, but not of limitation, exemplary embodiments of the present invention are shown in the accompanying drawings, in which:

FIGURE 1 is a side elevational view of an embodiment of the present invention in combination with a conventional lug-type container closure;

FIGURE 2 is an enlarged, fragmentary vertical sectional view taken substantially through the center in FIGURE 1, with the closure member removed, illustrating the embedded channel;

FIGURE 3 is an enlarged, fragmentary, exploded vertical sectional view showing another embodiment of the present invention in combination with another form of closure member;

FIGURE 4 is a view similar to that of FIGURE 3, but with the closure member attached to the plastic container;

FIGURE 5 is an enlarged, fragmentary, exploded vertical sectional view showing yet another embodiment of the present invention in combination with another closure member, and FIGURE 6 is a view similar to FIGURE 5 with the closure member attached to the container produced in accordance with the present invention.

With reference to the drawings, FIGURES 1 and 2 show a container 10 comprising an open end pail 12, formed of a suitable plastic material as hereinafter described, in combination with a conventional lug-type closure member 14. The pail 12 comprises a cylindrical side wall 16 and a bottom 18 formed integrally therewith (see FIGURE 1). As best shown in FIGURE 2, a bead 20 is formed along the upper edge of side wall 28.

The pail 12 is preferably formed from suitable semirigid plastics having strength sufficient to withstand the abuses a shipping container must take. Polyethylene is an especially suitable plastic material, although other thermoforming resins and co-polymers (e.g., polyolefins or plastics of the petrochemical family) may be employed.

The pail 12 may conveniently be formed from such a plastic material by a conventional injection molding process, although other methods of formation may also be used. For example, a suitable pail for use in accordance with the present invention embodies high density polyethylene side walls having a thickness of about 45 mils. However, as will be obvious to one skilled in the art, other materials and thicknesses may be employed depending upon the size of the container, the material to be shipped, and the uses for which the pail is intended.

In order to strengthen the plastic pail 12, a reinforcing channel 22 is embedded in the bead 20, preferably during the molding process. Reinforcing channel 22 is preferably formed of metal, although other reinforcing materials that are substantially more rigid than the plastic pail may be utilized. As best shown in FIGURE 2, channel 22 is generally U-shaped in cross-section, comprising a body portion 24 and a pair of flared legs 26. Channel 22 is preferably fabricated in a form of a closed loop in order to form a substantially rigid reinforcing member which is capable of imparting strength to the plastic pail 12.

In the embodiment shown in FIGURE 1, a conventional bail 30, provided with a hand grip 32, is attached to the plastic pail. Suitable means for attaching the bail 30 to the plastic pail 12 are described in applicant's aforesaid co-pending United States patent application.

Another embodiment of the present invention is illustrated in FIGURES 3 and 4. A container 40 comprising a plastic pail 42 in combination with a closure member 44 is illustrated therein. Pail 42 comprises an annular side wall 46 and a bottom (not shown) preferably formed integrally therewith. Side wall 46 is inwardly tapered as shown in the drawing so that a plurality of empty containers, similar to container 40, can be stacked therewith in a "nested" configuration. A bead 48, provided with a groove 50 in its outer edge, is formed along the upper edge of side wall 46 adjacent the open end of the container 40.

A metal reinforcing channel 52 is embedded in bead 48 during the fabrication thereof in the previously described manner. However, reinforcing channel 52, rather than being generally U-shaped, is generally rectangular in cross-section, and thus, has a hallow center section 54. As in the case of channel 22, channel 52 is preferably fabricated in the form of a closed loop in order to provide a rigid structure capable of imparting strength to the pail 42.

The closure member 44 is not of the lug type; rather, it is provided with an outer downwardly turned curl 56 which only partly covers bead 48 when positioned on pail 42 as shown in FIGURE 4.

In addition to downwardly turned curl 56, closure member 44 has a downwardly facing annular reinforcing curl 57 formed as a part thereof. In attaching closure member 44 to the pail 42, a layer of suitable thermoplastic sealing adhesive 58 is provided along the top surface of bead 48, and the closure member 44 is then positioned thereon so as to effect an airtight seal between the curl 56 thereof and the bead 48 of pail 42. In order to effect a complete closure of the container 40, a suitable length of sealing tape 60 is stretched around the periphery of the container so as to further serve to adhesively interconnect and seal the curl 56 and the bead 48.

In order to open the container 40, it is only necessary to manually strip the tape 60 away from the container and to manually insert a removal tool between the curl 56 and the bead 48 so as to pry the closure 44 away from the pail 42.

Still another embodiment of the present invention is illustrated in FIGURES 5 and 6. In accordance with the embodiment therein shown, a container 70, comprising a plastic pail 72 and a closure member 74, is shown. Pail 72, which is formed of a suitable plastic material in the previously described manner, has an annular side wall 76. Along the upper edge of side wall 76 adjacent the open end of the pail 72, a lateral flange 78 extends outwardly from wall 76 at approximately a 90° angle. A reinforcing bead 80 is formed integrally with flange 78, and a U-shaped circular metal channel 82 is embedded in bead 80. Channel 82 is fabricated in the form of a closed loop in order to form a substantially rigid reinforcing member. The bead 80 in combination with the U-shaped channel 82 serves to impart strength to the pail 72 in order to enable it to withstand the rigors of conventional shipping methods.

Closure member 74, which is of the lug type, is shown attached to pail 72 in FIGURE 6. Closure member 74 is provided with a downwardly facing curl 86 at its outer edge and, as shown in FIGURE 6, the cross-section curl 86 is similar to that of wall 76, flange 78, and bead 80. A layer of thermo-plastic sealing adhesive 84 is provided between flange 78 and bead 80 of pail 72 and curl 86 of closure 74. A plurality of lugs 88, each having an opening 90 provided therein, are formed along the lower edge of curl 86 and are adapted to be bent under bead 80 in order to firmly lock the closure 74 in position on pail 72.

Removal of the closure member 74 may be accomplished by inserting a screwdriver or other suitable tool into the openings 90 in lugs 88 in order to bend the lugs back to the position shown in FIGURE 6. It is then necessary only to apply sufficient force to break the adhesive seal layer 84 in order to remove the closure 74 from the pail 72.

As used in the appended claims, the term "channel" should be understood to encompass not only an open metal reinforcing member (such as the members identified by the reference character 22 in FIGURE 2 and by the reference character 82 in FIGURES 5 and 6), but also a closed reinforcing member (such as the reinforcing member having a rectangular cross-section which is identified by the reference character 52 in FIGURES 3 and 4).

An especial advantage of containers produced in accordance with the present invention is that such containers can be readily used with conventional container closures and equipment designed to apply such closures to containers, without detracting from the advantageous features achieved by the practice of the invention. Accordingly, significant economies may be derived through the use of plastic containers produced in accordance with the present invention. Furthermore, since the reinforcing channel of the present invention is of the closed loop variety, greater strength is imparted than would be the case with a structure having a split-ring supporting member. Also, since the reinforcing channel is completely embedded in the plastic of the container, the advantages of greater container life and manufacturing economy are obtained.

While a number of alternative forms have been described with reference to the features of the present invention, it should be understood that combinations of the described alternative forms may be utilized without deviating from the teachings of the present invention. It should further be understood that various other changes, modifications, and variations in the structure and function of the present invention may be effected without departing from the spirit and the scope thereof, as defined in the appended claims.

What is claimed is:
1. A reinforced container comprising:
an open end plastic pail having a generally cylindrical side wall structure and a bottom wall structure integral therewith,
a downwardly extending bead being formed adjacent the open end of the plastic pail and being offset outwardly from the side wall structure by a relatively narrow outwardly turned flange, the downwardly extending bead, the top portion of the side wall structure, and the relatively narrow flange cooperating to form an inverted generally U-shaped strength-imparting arrangement at the open end of the plastic pail; and a reinforcing channel formed of a material substantially more rigid than the plastic pail, the said reinforcing channel comprising a closed loop generally circular member embedded in and completely surrounded by the said bead and extending below the open end of the plastic pail, whereby the strength-imparting configuration and the reinforcing channel serve to support and reinforce the pail.

2. A reinforced container, as claimed in claim 1, wherein the material substantially more rigid than the plastic pail is metal and wherein the reinforcing channel is generally U-shaped in cross section.

3. A reinforced container, as claimed in claim 2, and further comprising:

a closure member adapted for attachment to the plastic pail so as to close the open end thereof; and sealing means adapted to effect an airtight seal between adjacent surfaces of the plastic pail and the closure member.

References Cited

UNITED STATES PATENTS

| | | | |
|---|---|---|---|
| 2,054,699 | 9/1936 | Geyer | 206—2 |
| 2,558,322 | 6/1951 | Stine. | |
| 2,606,485 | 8/1952 | Miller | 220—73 |
| 2,676,729 | 4/1954 | Neville et al. | 220—73 |
| 2,777,601 | 1/1957 | Cheeley | 220—59 |
| 2,816,070 | 12/1957 | Buchanan | 206—2 |
| 2,975,931 | 3/1961 | Harrison | 220—74 |
| 3,035,623 | 5/1962 | Goetz | 150—48 |
| 3,231,078 | 1/1966 | Balocca et al. | 220—46 |

FOREIGN PATENTS

| | | |
|---|---|---|
| 1,100,401 | 4/1955 | France. |
| 229,165 | 2/1925 | Great Britain. |
| 252,772 | 6/1926 | Great Britain. |

THERON E. CONDON, *Primary Examiner.*

RAPHAEL H. SCHWARTZ, *Examiner.*